(12) United States Patent
Denic et al.

(10) Patent No.: US 9,092,970 B2
(45) Date of Patent: Jul. 28, 2015

(54) PRIVACY PROTECTION FOR SMART METERING DATA

(71) Applicants: Stojan Denic, Bristol (GB); Georgios Kalogridis, Bristol (GB)

(72) Inventors: Stojan Denic, Bristol (GB); Georgios Kalogridis, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 123 days.

(21) Appl. No.: 13/713,866

(22) Filed: Dec. 13, 2012

(65) Prior Publication Data

US 2013/0154849 A1 Jun. 20, 2013

(30) Foreign Application Priority Data

Dec. 20, 2011 (GB) .................................. 1122015.9

(51) Int. Cl.
G06F 1/28 (2006.01)
G08C 19/00 (2006.01)
G06F 21/62 (2013.01)

(52) U.S. Cl.
CPC ............ *G08C 19/00* (2013.01); *G06F 21/6245* (2013.01)

(58) Field of Classification Search
CPC ..................................................... G01D 4/002
USPC ......... 340/870.02; 700/286, 291, 295; 702/61
See application file for complete search history.

(56) References Cited

U.S. PATENT DOCUMENTS

| | | |
|---|---|---|
| 2009/0045804 A1 | 2/2009 | Durling et al. |
| 2010/0087959 A1 | 4/2010 | Williams, Jr. |
| 2011/0270453 A1* | 11/2011 | Kalogridis et al. ........... 700/291 |
| 2011/0271352 A1* | 11/2011 | Kalogridis et al. ............ 726/26 |
| 2012/0059528 A1* | 3/2012 | Umesawa et al. ............ 700/295 |

FOREIGN PATENT DOCUMENTS

| | | |
|---|---|---|
| GB | 2473083 A | 3/2011 |
| GB | 2479908 A | 11/2011 |
| GB | 2479956 A | 11/2011 |
| JP | 6-291759 A | 10/1994 |
| JP | 2002-77135 A | 3/2002 |
| JP | 2007-288480 A | 11/2007 |
| JP | 2008-90544 A | 4/2008 |
| JP | 2011-155713 A | 8/2011 |
| JP | 2011-188620 | 9/2011 |
| JP | 2011-244441 A | 12/2011 |
| JP | 2011-244681 A | 12/2011 |
| WO | WO 2011/089854 A1 | 7/2011 |

OTHER PUBLICATIONS

Combined Search and Examination Report issued Jul. 25, 2012 in United Kingdom Patent Application No. 1122015.9.
David Varodayan, et al., "Smart Meter Privacy Using a Rechargeable Battery: Minimizing the Rate of Information Leakage", IEEE ICASSP, 2011, pp. 1932-1935.

(Continued)

*Primary Examiner* — Brent Swarthout
(74) *Attorney, Agent, or Firm* — Oblon, McClelland, Maier & Neustadt, L.L.P.

(57) ABSTRACT

Metering of a physical characteristic is described, in which a stochastic approach is taken. A random signal is generated on the basis of a metering signal, with a view to maximising a statistical distance between the two. The random signal and the metering signal are mixed together to obscure characteristics of the metering signal which could otherwise divulge private information to third parties.

8 Claims, 4 Drawing Sheets

(56) References Cited

OTHER PUBLICATIONS

Mitsuhiro Tomosada, et al., "Virtual Energy Demand Data: Estimating Energy Load and Protecting Consumers' Privacy", IEEE, 2011, pp. 1-8.

Office Action issued Feb. 12, 2014 in Japanese Patent Application No. 2012-277735 (with English language translation).

Shinji Yamanaka, et al., "A study on privacy protection scheme for Smart Grid using homomorphic encryption", Report of the IEICE, The Institute of Electronics, Information and Communication Engineers, vol. 111, No. 240, (Oct. 2011), pp. 7-12 (with English abstract).

G. Kalogridis, et al, "Privacy protection system and metrics for hiding electrical events", International Journal of Security and Networks, vol. 6, No. 1, (2011), pp. 14-27.

G. Kalogridis, et al., "ElecPrivacy: Evaluating the Privacy Protection of Electricity Management Algorithms", IEEE Transactions on Smart Grid, vol. 2, No. 4, (Dec. 2011), pp. 750-758.

* cited by examiner

PRIVACY PROTECTION FOR SMART METERING DATA

FIELD

Embodiments described herein relate to privacy protection of data collected in smart metering.

BACKGROUND

Smart metering offers an opportunity to collect and store information (such as power consumption) from a utility grid at household level with increased granularity. Although current policy regulations are restrictive from the point of view of the collected data reuse, the storage of this data opens up a possibility for its misuse. If the collected and stored data become available to parties other than the intended user (in this case a utility company), such as law enforcement agencies, marketing agencies and malicious individuals, this could represent a privacy and/or security risk for consumers.

The term "smart grid" is a recently coined term which represents a large number of different technologies aiming at improving existing electrical power distribution networks. Existing power distribution networks tend to be of an aging character, and one of the general goals of smart grid technology is to bring intelligence into networks to improve efficiency and robustness such that they will be more capable of responding to new higher consumption demands.

One way to adjust to new demands is to employ communication and control networks which will enable a frequent scanning of the power network state and carrying out appropriate actions to provide its stability and functionality.

Power data is being collected with increased granularity. Storage of this detailed data in the smart grid introduces concerns about consumers' privacy. These concerns may be justified by the use of non-intrusive appliance load monitors (NALM), which analyse power signals to track appliance usage patterns. Research suggests that information gathered from the power signals accompanied with other available information can be used to build profiles of house occupants. This could represent a serious privacy threat both for individuals, and for companies and government organisations.

One way of addressing privacy requirements is to develop regulatory data privacy frameworks and policies, based on standard privacy principles such as notice, choice and consent. Anonymity services can also help protect privacy. For example, metering data can be aggregated and encrypted. Alternatively, the data can be separated into low frequency attributable data (for example, data used for billing) and high frequency anonymous technical data (for example, data used for demand-side management).

DETAILED DESCRIPTION

Figure 1:
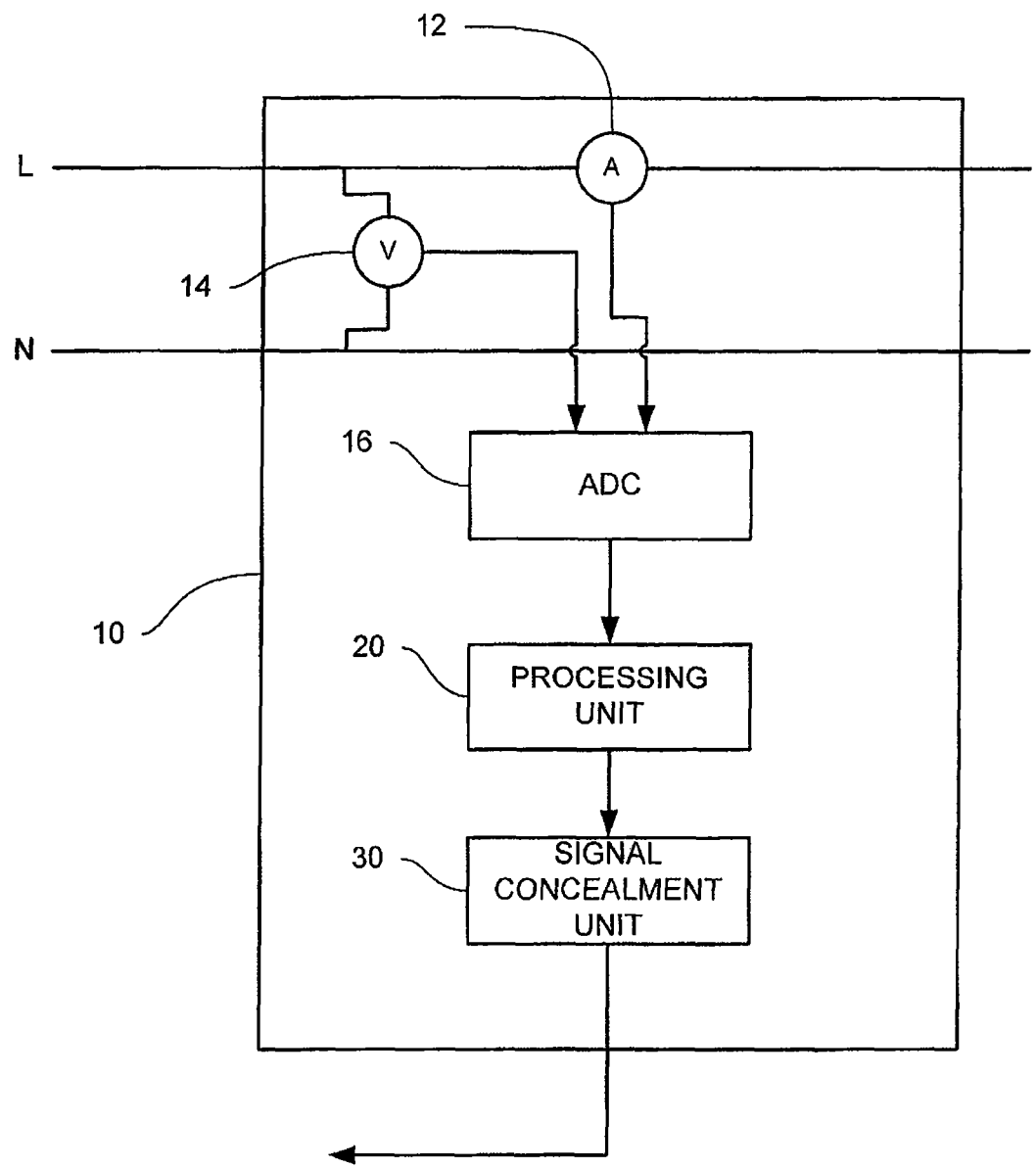
FIG. 1 is a schematic diagram of a smart meter in accordance with a described embodiment.

Classical methods of privacy protection assume that there is a threat outside the system from which the system should be protected. However, another type of threat comes from within the system; for example, the utility company which collects the data could misuse the data, breaching the privacy of their customers. Methods which address this type of threat have been introduced recently. For example, an alternative protection scheme has been proposed in which energy flow within a home is controlled by running a portion of a consumption demand off a rechargeable battery, rather than directly off the grid. That method tends to keep the value of the transformed signal constant as long as battery capacity allows. Generally speaking, in accordance with information theory, the low variability of the signal corresponds to a low amount of information exposed by the signal. Thus, an intruder will obtain only limited amount of information about the consumer if the transformed signal is observed. That approach transforms a consumer power signal in such a way to mask appliance usage patterns; the transformed signal is then sent to the utility company. Of course, the transformed signal has to retain certain features of the original signal which are operationally important to the utility company. However, the utility company will not obtain details which, if misused, could represent a privacy threat.

To protect the privacy of the consumer, embodiments described herein provide an appropriate signal mapping which transforms collected power consumption data into a form which hides information critical for consumers' privacy. On the other hand, the transformation preserves certain features of the collected data which are important for operation of the utility company. The transformed data is further available to the utility company.

Embodiments described herein employ a stochastic method for privacy protection which is based on an information theoretic measure for a distance between two probability distributions, known as divergence. The described method is a stochastic scheme that maximizes the distance between the distribution of the collected data and the distribution of the transformed data while at the same time it preserves important features of the originally collected signal. From this point of view, embodiments of the described method can be made optimal, to give the best possible protection against an intruder.

An embodiment provides a method to transform a smart metering data to protect the privacy by using a stochastic mapping.

The above described method can involve mixing of a random signal with the collected smart metering data producing the transformed output signal.

The random signal may be generated according to a distribution which maximizes the distance between the collected smart metering data and the transformed data distributions.

The distance between two distributions may be measured by one of information or measure theory distances (for example K-divergence).

A battery may be used to moderate the transformed signal.

One aim which may be achieved by certain embodiments described herein is to enable a smooth transition to the smart grid without compromising privacy.

To measure the performance of privacy algorithms, embodiments described herein apply an information theoretic measure known as K-divergence. Previously proposed algorithms do not optimize the performance with respect to the performance measures, so in this disclosure methods are proposed which maximize the distance between the collected power data and the transformed data (available to the utility company) with respect to K-divergence. The assumption is that the larger the distance between collected power data and transformed data, the better the data protection. Improvements in performance become achievable by the introduction of randomness into the method.

FIG. 1 provides a schematic illustration of a smart meter 10 implementing the embodiment described herein.

The smart meter 10 is illustrated in situ installed on a single phase AC power supply, with a live rail and a neutral rail. An earth rail would no doubt also be present, but is omitted for clarity.

The meter 10 comprises a current sensor 12 on the live rail, and a voltage sensor 14 between the live rail and the neutral rail. Outputs from the sensors 12, 14 feed into an analogue to digital converter (ADC) 16 which passes quantised voltage and current data to a processing unit 20. The processing unit 20 in use produces a consumer power signal p(t) which could, in a simple case, be passed directly back to a consumer power supply utility. In the present embodiment, however, the power signal p(t) is passed to a signal concealment unit 30.

In general terms, the purpose of the signal concealment unit 30 is to apply a mapping $g$ to p(t) to obtain a transformed signal $p_M = g(p)$. $p_M(t)$ is made available to the utility company, and the probability distribution of $p_M(t)$ is at a distance as large as possible from the probability distribution of p(t). This conceals, from the utility company, and from any third parties, the exact nature of power consumption behaviour of the metered party.

Figure 2:
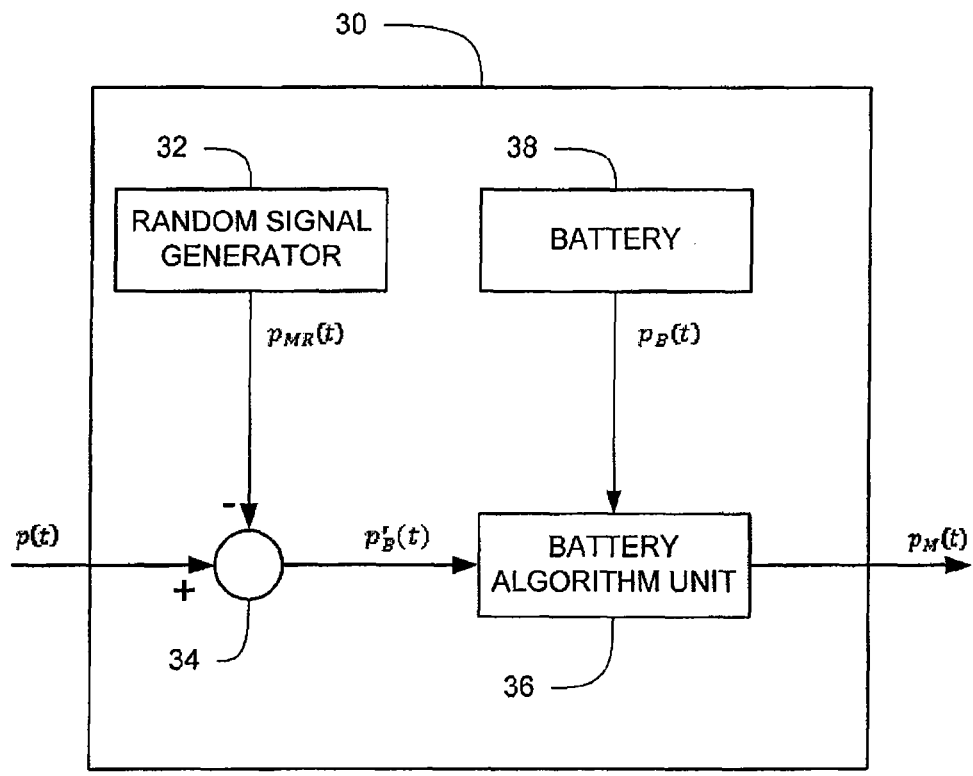
FIG. 2 is a schematic diagram of a signal concealment unit of the smart meter illustrated in FIG. 1.

The signal concealment unit 30, of a first example of the embodiment, is illustrated in FIG. 2. The signal concealment unit 30 comprises a random signal generator 32 and a signal subtractor 34. The random signal generator 32 is operable to generate a random signal $p_{MR}(t)$ whose probability distribution is chosen in a manner which will be described in due course.

The signal $p_{MR}(t)$ is mixed with the signal p(t) obtained from the smart meter 20 and then further processed by a battery algorithm unit 36 to generate the transformed signal $p_M(t)$. The battery algorithm unit 36 relies on a battery 38 to assist in moderating the consumer power signal p(t). The computation of the $p_{MR}(t)$ probability distribution and the operation of the battery algorithm are explained below.

Computation of Optimal $p_{MR}(t)$ Distribution

The distribution of $p_{MR}(t)$ is obtained by solving a constrained optimization problem which is described next. The solution is based on the Markov chain representation of p(t) and $p_{MR}(t)$.

First, an objective function and constraints are defined. The objective function can be expressed in terms of information divergence function, for example, the K-divergence. For two probability distributions $P_1(x)$ and $P_2(x)$, the K-divergence is defined by $$K(P_1 \| P_2) = \sum_x P_1(x) \ln \frac{2P_1(x)}{P_1(x) + P_2(x)}$$

A conditional K-divergence is also defined following a definition of the conditional Kullback-Leibler divergence [T. M. Cover and J. A. Thomas, "Elements of information theory" John Wiley & Sons, Inc. New York, N.Y., USA, 2006]. For two conditional probability distributions $P_1(y|x)$ and $P_2(y|x)$, the conditional K-divergence is defined by $$K_{y|x}(P_1 \| P_2) = \sum_x P_1(x) \sum_y P_1(y|x) \ln \frac{2P_1(y|x)}{P_1(y|x) + P_2(y|x)}$$

The conditional K-divergence is required since Markov chains are used to model the signals p(t) and $p_{MR}(t)$.

One way to represent a continuous amplitude signal (such as p(t) and $p_{MR}(t)$ by a Markov chain is to quantize or cluster it into M clusters. Then, a Markov chain representation of the signal is characterized by its transition probability matrix $T := [t_{ij}]$, $1 \le i,j \le M$, where $t_{ij} = \Pr\{i|j\}$ is the conditional probability of moving from state j to state i. When the signal is clustered into M clusters, $t_{ij}$ represents the probability of moving from cluster j to cluster i.

The transition probability matrices of the Markov chain representations of p(t) and $p_{MR}(t)$ are denoted T and $T_{MR}$, respectively. Then, the conditional K-divergence between the signals $p_{MR}(t)$ and p(t) is the objective function of the optimization problem and is written as $$K_{i|j}(T_{MR} \| T) = \sum_j P_{pMR}(j) \sum_i t_{MR,ij} \ln \frac{2t_{MR,ij}}{t_{ij} + t_{MR,ij}}$$

Here, $P_{pMR}$ represents the steady-state distribution of $p_{MR}(t)$ [Cover and Thomas]. The constraints on the optimization problem come from the requirements that the modified signal $p_M(t)$ retain certain characteristics of the consumer power signal p(t), for example in terms of a mean value $E[p_{MR}(t)] = E[p(t)]$ and variance $Var[P_{MR}(t)] = Var[p(t)]$. Hence, the optimization problem can be defined as $$\max_{T_{MR}} K_{i|j}(T_{MR} \| T)$$

subject to
$E[p_{MR}(t)] = E[p(t)]$
$Var[p_{MR}(t)] = cVar[p(t)]$
where c is a positive constant. This optimization problem can be solved numerically giving the matrix $T_{MR}^a$ which maximizes the K-divergence. The signal $p_{MR}(t)$ is now created by the random number (Markov) generator and mixed with p(t).

From the above consideration, it can be seen that the underlying principle embodied in the method is the construction of a distribution for the signal $p_{MR}(t)$ which will produce a modified signal $p_M(t)$ whose distribution is far away from the distribution of p(t) as measured by the K-divergence.

Battery Algorithm

The described battery 38 is a source of a battery signal $p_B(t)$. The battery 34 has the following characteristics:
1. The battery has a finite energy capacity $E_C$ (hence, it has to maintain its energy by recharging), i.e. $0 \le \int_0^{t_1} p_B(t) dt \le E_C$ for all $t_1 \in [0,T]$ (assuming that for $t_1=0$, the battery is fully charged).
2. The battery has a maximum discharge and recharge power of $P_D$ and $P_R$, i.e. $-P_R \le p_B(t) \le P_D$ for all t.

As can be seen from FIG. 2, the input to the battery algorithm unit 36 is the difference between p(t) and $p_{MR}(t)$. The difference $p(t) - p_{MR}(t)$, denoted by $p'_B(t)$, is dealt with by the battery algorithm. The battery 38 recharges or discharges depending on its current state and on the size and sign of $p'_B(t)$. If $p(t)-p_{MR}(t)=p'_B(t)>0$ the battery discharges by $p'_B(t)$; otherwise, it recharges by $|p'_B(t)|$. Here, it is assumed that:

1. $|p'_B(t)| \leq P_D = P_R$
2. the battery capacity $\int_0^{t_1} p_B(t)dt$ is in such a state that it can be discharged/recharged by $|p'_B(t)|$.

Then, the output of the battery algorithm unit 36 is given by $p_M(t)=p_{MR}(t)$. If the conditions 1) and 2) are not satisfied, the battery algorithm unit 36 has to modify the signal $p_{MR}(t)$ so it complies to the conditions 1) and 2).

Figure 3:
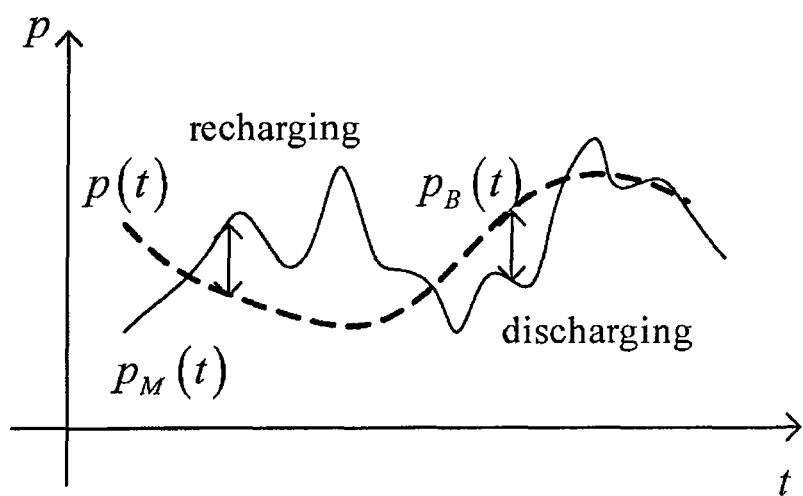
FIG. 3 is a graph of typical output of the smart meter illustrated in FIG. 1.

The described approach introduces a random source $p_{MR}(t)$ with the optimal distribution as the input to the battery algorithm. This situation is illustrated in FIG. 3. It can be seen that the output $p_M(t)$ is a random signal which has the same mean value as the input signal $p(t)$.

It will be observed through an example (set out below) that the K-divergence between $p_M(t)$ and $p(t)$ is larger for the described stochastic method than for previously proposed deterministic approaches.

Other Embodiments

The described approach can also be used in cases where different constraint functions (requirements) are imposed by the system. In such a case, the optimization problem is modified and the obtained $p_{MR}(t)$ may also be modified, which will ultimately result in a different $p_M(t)$, and in a different level of measured privacy protection.

More specifically, the following example considers a case wherein a system (for example utility or a user) applies further constraints. There could be different reasons underpinning this requirement. For example, the utility may wish the consumer to exhibit more stable power consumption. That is, in this case, the utility may wish $p_M(t)$ to be closer to $p_M(t-1)$. According to this alternative embodiment, an attempt is made to maximise the K-divergence between $p_{MR}(t)$ and $p(t)$ with the given constraints. In one possible alternative implementation, it is desired to bound $p_{MR}(t)$ so that $p_{MR}(t)$ is close to $p_M(t)$.

In all cases, it will be noted that the success of obtaining a power consumption $p_M(t)$ that is equal to $p_{MR}(t)$, or $p_M(t-1)$, depends on the physical battery energy/power limitations.

In general, other alternative optimization problems may be considered, where the signals $p_{MR}(t)$ and/or $p'_B(t)$ are further modified.

In the following the performances of previously disclosed deterministic methods are compared with a particular example of the above described embodiment (which uses a stochastic approach). In this example, the size of the battery is $P_D = P_R = 1$ kW/$E_C = 2$ kWh. For the input signal $p(t)$, real data are used, obtained by measuring the overall power consumption (mains) in an apartment for 30 days. The sampling interval is chosen to be $T_S = 30$ s.

Figure 4:
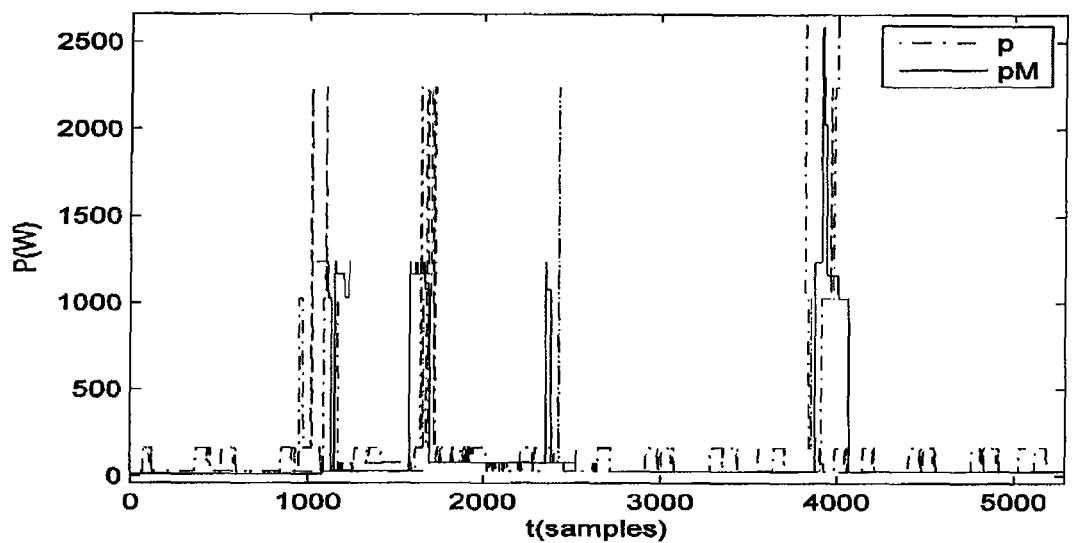
FIG. 4 is a graph of test results for a deterministic method of concealment.
Figure 5:
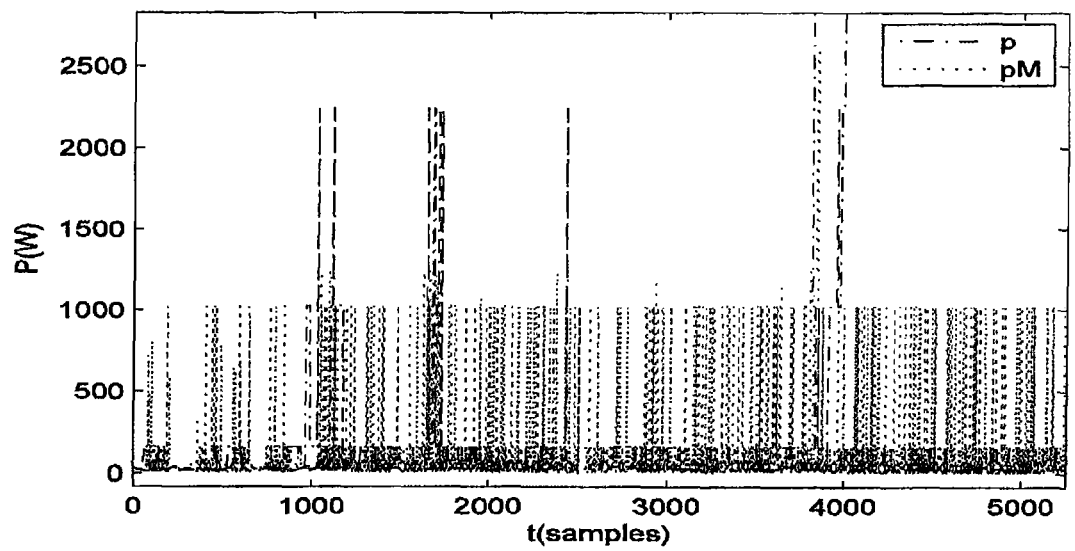
FIG. 5 is a graph of test results for a stochastic method of concealment, in accordance with an example of operation of a smart meter of a described embodiment.

FIG. 4 and FIG. 5 show typical input and output signals for deterministic and stochastic privacy methods, respectively. The two figures underline an evident difference between the two approaches; the deterministic approach tends to smooth the input data, while the stochastic method gives very noisy output $p_M(t)$. If the measure of the performance is the K-divergence, its value for the deterministic algorithm is 0.25 while for the stochastic approach it is 0.44. The maximum value for the K-divergence is $0.69 \cong \ln 2$. The efficiency of the stochastic method is $0.44/0.69=0.64$, while for the deterministic method it is $0.25/0.69=0.36$. So, this particular example provides a performance improvement over the deterministic approach used as a comparison.

Similar ratios are obtained when the size of the battery is varied. For example, when $P_D=P_R=1.2$ kW/$E_C=2.4$ kWh, the K-divergence for the stochastic method is 0.4691, while for the deterministic case 0.2759.

While the above description suggests the implementation of a smart meter in accordance with a described embodiment by way of hardware, the reader will appreciate that processing of a signal can be implemented in software on a suitable software configurable signal processing apparatus. The software may be embodied in the form of a computer program, delivered as a computer program product. The computer program product may be in the form of a carrier medium, such as a storage medium, for example an optically readable disk or a solid state electronic storage device. On the other hand, the carrier medium may be in the form of a signal, bearing digital information defining the computer program product, which may be receivable by the configurable signal processing apparatus. In one arrangement, the smart meter may be operable to receive communications on a recognised communications protocol. Appropriately, the smart meter may be operable to receive powerline communications on a powerline communications protocol, and it may be by this means that a smart meter, of general construction, may receive a computer program product to enable it to be configured in accordance with a described embodiment.

As will be understood, the computer program product may encompass all of the computer executable instructions required for a smart meter to perform in accordance with a described embodiment. Alternatively, a computer program product could be provided which refers to or uses pre-existing (and assumed to be pre-existing) software and hardware facilities of the smart meter, such as applications, call-outs and routines. The computer program product could then be described as an "app" or a "patch" depending on whether the computer program product provides entirely new facilities to the smart meter or if it enhances existing facilities. The computer program product may be self executing and delivered without a user's knowledge, or could be retrieved from a remote server by user request, either by controls offered on a control panel of the smart meter itself or by a smart meter user interface provided by, for example, wireless connection to a laptop or the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing form the spirit of the inventions. The accompanying claims and their equivalents are intended to cover such forms or modifications as would fall within the scope and spirit of the inventions.

The invention claimed is:

1. A metering device for metering a physical characteristic and for delivering information to a third party on the basis of collected metering information, the metering device comprising:

signal collecting means operable to collect a metering signal comprising information relating to the metered physical characteristic, random signal generating means operable to generate a random signal on the basis of the received metering signal by:

determining a distribution, in time, of the metering signal, and determining a probability distribution for the random signal on the basis of the distribution of the metering signal by maximizing a statistical distance between the probability distribution of the random signal and the distribution of the metering signal;

signal processing means operable to process the metering signal and the random signal to produce a modified metering signal, and signal emission means operable to emit said modified metering signal to said third party.

2. A metering device in accordance with claim 1 wherein the statistical distance is the K-divergence.

3. A metering device in accordance with claim 1 and comprising mixing means for mixing the random signal with the metering signal to produce a mixed signal.

4. A metering device in accordance with claim 3 and further comprising a rechargeable battery and battery discharge means, the battery discharge means being operable to apply a battery discharge to the mixed signal dependent on the difference between the mixed signal and the voltage state of the battery, to produce the modified metering signal.

5. A method of metering a physical characteristic and delivering information to a third party on the basis of collected metering information, the method implemented in a metering device, the metering comprising:

collecting, using a signal collecting means, a metering signal comprising information relating to the metered physical characteristic, generating, in a random signal generating means, a random signal on the basis of the collected metering signal by:

determining a distribution, in time, of the metering signal, and determining a probability distribution for the random signal on the basis of the distribution of the metering signal by maximizing a statistical distance between the probability distribution of the random signal and the distribution of the metering signal, processing, in a signal processing means, the metering signal and the random signal to produce a modified metering signal, and emitting, through a signal emission means, said modified metering signal to said third party.

6. A method in accordance with claim 5 wherein the statistical distance is the K-divergence.

7. A method in accordance with claim 5 and comprising mixing the random signal with the metering signal to produce a mixed signal.

8. A method in accordance with claim 7 and further comprising applying a battery discharge to the mixed signal dependent on the difference between the mixed signal and the voltage state of the battery, to produce the modified metering signal.

* * * * *